(12) United States Patent
Martin et al.

(10) Patent No.: US 6,679,668 B2
(45) Date of Patent: Jan. 20, 2004

(54) DOUBLE-ENDED FASTENER

(75) Inventors: Dannie E. Martin, Casselberry, FL (US); Michael S. Lee, Rockville, MD (US)

(73) Assignee: Bell South Intellectual Property Corporation, Wilmington, DE (US)

( * ) Notice: Subject to any disclaimer, the term of this patent is extended or adjusted under 35 U.S.C. 154(b) by 72 days.

(21) Appl. No.: 09/730,793

(22) Filed: Dec. 7, 2000

(65) Prior Publication Data

US 2002/0164228 A1 Nov. 7, 2002

(51) Int. Cl.⁷ .............. F16B 35/00; F16B 15/00
(52) U.S. Cl. .......... 411/388; 411/459; 411/470
(58) Field of Search ............... 411/388, 389, 411/400, 401, 402, 458, 459, 460, 473, 470

(56) References Cited

U.S. PATENT DOCUMENTS

| 321,389 A | * | 6/1885 | Schirmer |
| 346,148 A | * | 7/1886 | Durham |
| 817,090 A | * | 4/1906 | Pfeiffer |
| 1,036,229 A | * | 8/1912 | Harrild |
| 1,150,358 A | * | 8/1915 | Gilmer |
| 5,059,077 A | * | 10/1991 | Schmid |
| 6,102,642 A | * | 8/2000 | Kawashita |

FOREIGN PATENT DOCUMENTS

CH 247664 * 12/1947

* cited by examiner

Primary Examiner—Flemming Saether
(74) Attorney, Agent, or Firm—Shaw Pittman LLP

(57) ABSTRACT

A fastener and an installation tool are disclosed. The fastener is double-ended and allows two opposed items to be joined. The fastener also produces a blind joint, so that the fastener itself is invisible after the joint has been formed. An accompanying installation tool assists in installing one end of the fastener.

1 Claim, 3 Drawing Sheets

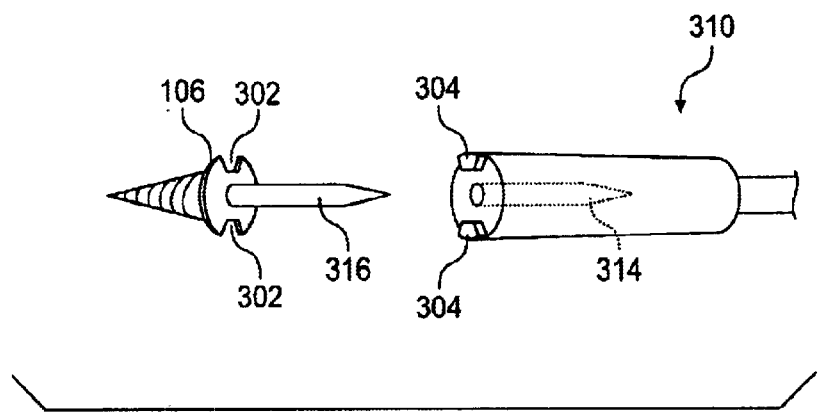
FIG. 3
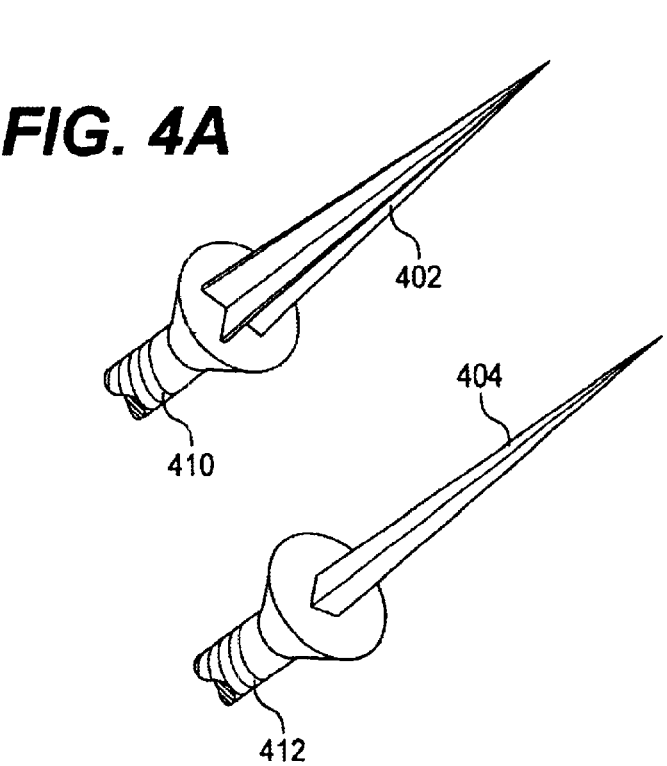
FIG. 4A
FIG. 4B
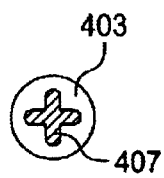
FIG. 4C
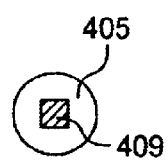
FIG. 4D

DOUBLE-ENDED FASTENER

BACKGROUND

1. Field of the Invention

The present invention is directed to a fastener, and more particularly, to a double-ended fastener that can engage two opposing members.

2. Background of the Invention

Sometimes it is necessary to produce blind joints. A blind joint is a joint where, after the joint has been assembled, the joint itself becomes invisible to observers. These joints are preferred over other types of joints because they hide the appearance of the actual joint itself.

Mechanical fasteners, such as nails and screws, can also be used to create joints. Mechanical fasteners are generally much easier to use (they require little or no skill), and can be used to produce joints quickly. However, mechanical fasteners by themselves cannot be used to create blind joints. In other words, after a joint has been assembled using mechanical fasteners, those mechanical fasteners are generally exposed and visible. On some pieces, for example, high-quality furniture and trimwork, the appearance of exposed mechanical fasteners such as nails and screws is inappropriate.

Blind joints currently exist, but prior art blind joints require expensive tools, jigs, or fixtures, and are usually difficult to make. Some examples of existing blind joints include the mortise-and-tenon joint, half-blind dovetail joint, double-blind dovetail, a dowel joint and a biscuit joint. As well known in the prior art, these joints require either considerable machining and skill, in the case of the mortise-and-tenon joint, half-blind dovetail joint, and the double-blind dovetail, or expensive jigs and fixtures and specialized tools, in the case of the dowel joint and the biscuit joint.

In addition to the specialized tools, considerable skill is also required to properly make the joints. They also require a considerable amount of time to lay out and prepare the various tools to make the appropriate cuts for these joints. So these prior art joints are time-consuming in two ways: an artisan would require time to practice and develop the necessary skills to produce the joints, and once the artisan has learned the craft of making the joint, actually making the joint itself is time-consuming.

SUMMARY AND OBJECTS OF THE INVENTION

Accordingly, the present invention is directed to a fastener and an installation tool that substantially obviates one or more of the problems due to limitations and disadvantages of the related art.

An object of the present invention is to provide a fastener that can join two opposed items.

Another object of the present invention is to provide a fastener that produces a blind joint, meaning that the fastener itself is invisible after the joint has been formed.

Another object of the present invention is to provide a fastener that is easy to install and requires little skill.

Another object of the present invention is to provide a fastener that allows two opposed items to be joined quickly.

Additional features and advantages of the invention will be set forth in the description which follows, and in part will be apparent from the description, or may be learned by practice of the invention. The objects and other advantages of the invention will be realized and attained by the structure particularly pointed out in the written description and claims, as well as the appended drawings.

To achieve these and other advantages and in accordance with the purpose of the present invention, as embodied and broadly described, the double-ended fastener includes a first end having a threaded portion and a second end including a nail portion. A platform is disposed between the first and second ends and the platform includes a grasping portion that can be engaged to twist or torque the fastener.

BRIEF DESCRIPTION OF THE DRAWINGS

FIG. 3 is an assembly view of another embodiment of the present invention.

FIG. 4A is an isometric view of a cross-shaped nail embodiment in accordance with the present invention.

FIG. 4B is an isometric view of a square-shaped nail embodiment in accordance with the present invention.

FIG. 4C is an end view of a cross-shaped installation tool in accordance with the present invention.

FIG. 4D is an end view of a square-shaped installation tool in accordance with the present invention.

DETAILED DESCRIPTION OF A PREFERRED EMBODIMENT(S)

Figure 1:
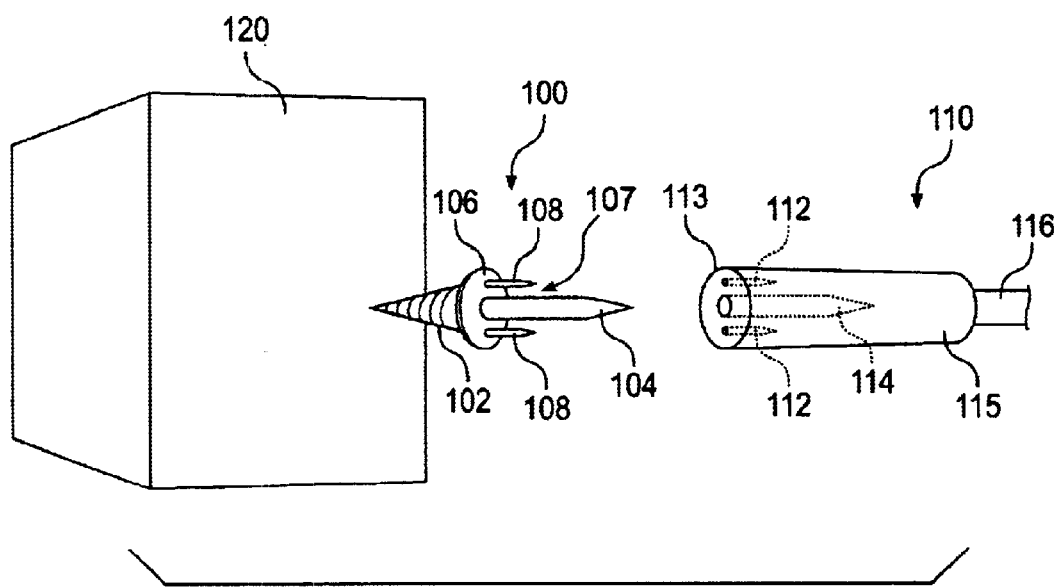
FIG. 1 is an assembly view of an embodiment of the present invention.

FIG. 1 shows an embodiment of the present invention. The present invention includes a fastener 100 having a first end 102 and a second end 104. Both the first end 102 and the second end 104 include a fastener portion. Any type of fastener could be used at either end. The embodiment shows a threaded fastener at the first end 102 and a nail fastener at the second end 104. The embodiment also includes a grasping portion 107 that allows a tool to apply a torque to the fastener. By using the grasping portion 107, a tool can apply a sufficient amount of torque to twist the threaded portion of the fastener into a first member 120. Any meshing arrangement where an installation tool can transmit torque or twist to the fastener may be used in accordance with the present invention.

In one embodiment of the present invention, the grasping portion 107 includes two projections 108 disposed on the platform 106 of the fastener. Preferably, an installation tool 110 is provided to assist in screwing the fastener into a member 120. Preferably the installation tool includes a contour, shape or surface disposed on a first end 113 that is capable of torquing the fastener. Preferably the installation tool 110 is capable of grasping fastener 100 at grasping portions 108 and, by meshing with the grasping portions, is able to twist the screw into the member.

Preferably, installation tool 110 includes a body portion 115 and a shaft portion 116. Shaft portion 116 is preferably rigidly related to body portion 115 and can be used to apply a torque to body portion 115. Shaft portion 116 can be attached to either a hand tool or a power tool. If shaft portion 116 were driven by hand, the other end of shaft portion 116 would include a handle portion, preferably one that resembles a typical screwdriver. On the other hand, if shaft portion 116 were driven by a power tool, the other end of shaft portion 116 would include a configuration that would permit shaft portion 116 to mate with the power tool. Preferably, a hexagonal cross-section could be employed so that shaft portion 116 could engage a standard drill chuck.

Body portion 115 includes a first end 113 that is adapted to engage fastener 100. Body portion 115 includes a cavity 114 that is open at the first end 113. Cavity 114 is sized to accommodate nail 104. Body portion 115 also includes a grasping member that is capable of engaging grasping portions 108 and applying a torque to fastener 100. In the preferred embodiment, the grasping member comprises two small cavities 112 that are adapted to hold pins 108.

Figure 5:
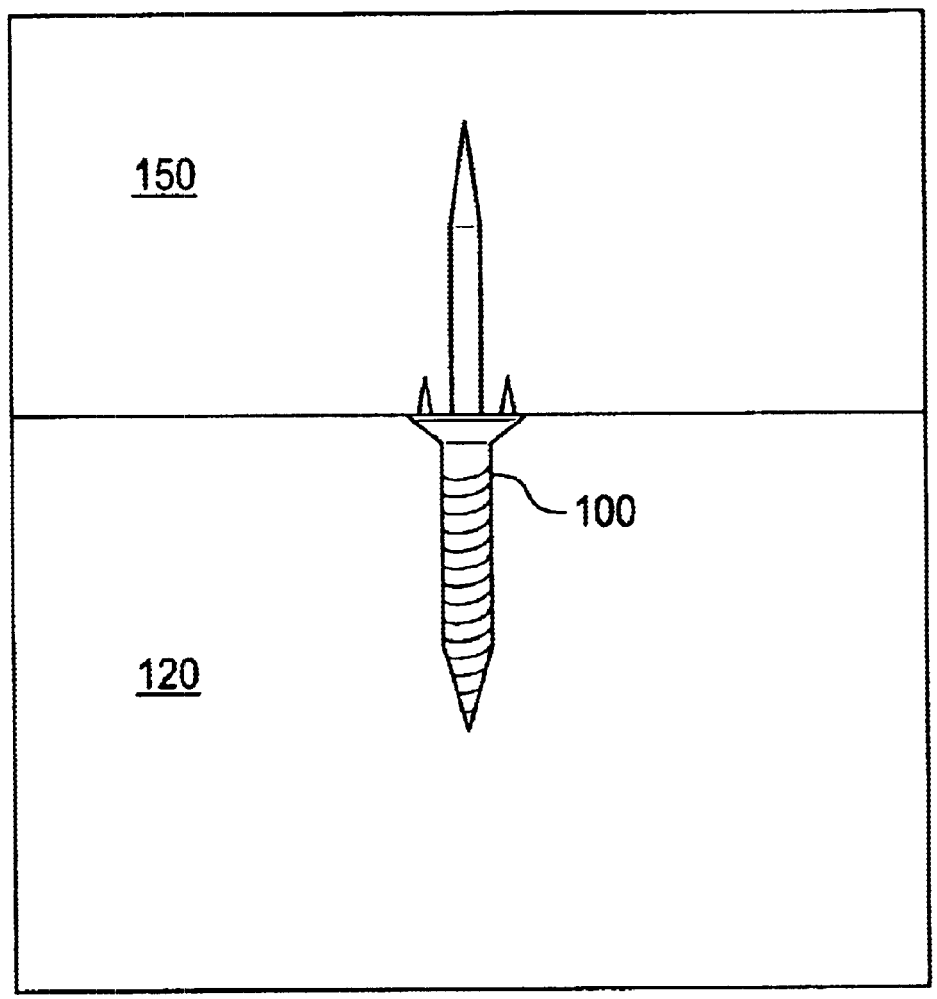
FIG. 5 is a cross-sectional view showing a fastener in the assembled condition in accordance with the present invention.

After pins 108 have entered cavity 112, installation tool 110 is then able to twist or apply a torque to fastener 100, and thus drive the first end 102 of fastener 100 into a member 120. After the first end 102 of fastener 100 has been installed into member 120, nail 104 and pins 108 are exposed. Because nail 104 is exposed, a second member 150 (see FIG. 5) can be pressed onto nail 104 and assume a position where it abuts against the first member 120. In this way, a blind joint can be formed using the preferred fastener. See FIG. 5.

Figure 2:
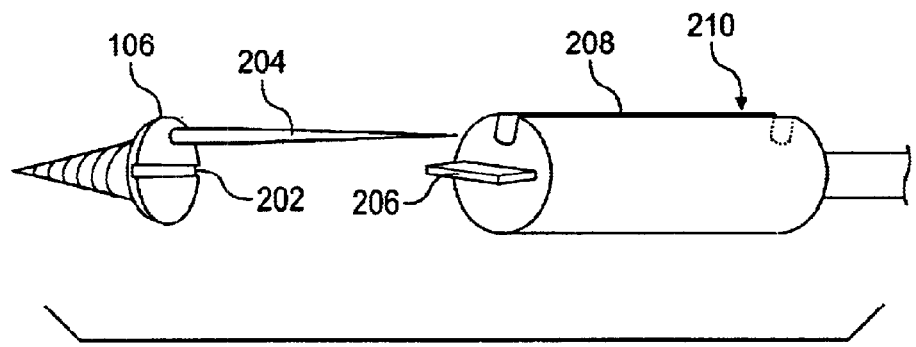
FIG. 2 is an assembly view of another embodiment of the present invention.

FIG. 2 is a second embodiment of the present invention. In this embodiment, nail 204 is off-center and placed near the rim of platform 106. Instead of pin projections 108 (see FIG. 1), that were used as the grasping member, the second embodiment uses a slot 202 as the grasping member. Installation tool 210, according to the second embodiment, includes a groove or slot 208 that accommodates nail 204. Installation tool 210 also includes a projection 206 that resembles the end of a slotted screwdriver to engage slot 202 on the fastener.

FIG. 3 shows a third embodiment of the present invention. In this embodiment, the grasping members are formed by notches 302 disposed on the rim of platform 106. Installation tool 310 includes corresponding projections 304 that engage notches 302. Like the other installation tools, installation tool 310 includes a cavity 314 that accommodates nail 316.

FIGS. 4A and 4B show other embodiments of the present invention. For purposes of providing an enlarged view, portions of threaded portions 410 and 412 have been omitted from FIGS. 4A and 4B. In these embodiments, the grasping portion is combined with the nail and the grasping members are combined with the cavities. FIG. 4A includes a nail 402 that has a cross-section resembling a cross. FIG. 4B includes a nail 404 that has a cross-section resembling a square.

FIG. 4C shows an end view of a suitable installation tool 403 for the cross-shaped nail 402 embodiment. Installation tool 403 includes a cross-shaped cavity 407 that corresponds to cross-shaped nail 402 and is capable of accommodating cross-shaped nail 402. Similarly, FIG. 4D shows an end view of a suitable installation tool 405 for the square-shaped nail 404. Installation tool 405 includes a square-shaped cavity 409 that can accommodate square-shaped nail 404 and drive square-shaped nail 404.

FIGS. 4A and 4B represent two preferred examples of cross-sectional shapes that can be selected. Any cross-sectional shape that is capable of transmitting a torque or twist onto fastener 100 may be used.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto and by their equivalents.

We claim:

1. A fastener comprising:

a first end including a threaded portion;

a second end including a nail portion of a first length; and a platform disposed between the first end and the second end, the platform including a plurality of pins protruding from the platform, distinct from the nail portion and adapted to engage a tool that is capable of applying a torque on the fastener and wherein the nail is centrally located between the pins, and the length of each of the plurality of pins is less than half of the first length.

* * * * *